United States Patent
Smith et al.

(10) Patent No.: US 9,192,928 B1
(45) Date of Patent: Nov. 24, 2015

(54) REGENERATION OF AN IONIC LIQUID CATALYST USING METAL COMPLEXES

(71) Applicant: UOP LLC, Des Plaines, IL (US)

(72) Inventors: Stuart Smith, Lake Zurich, IL (US); Alakananda Bhattacharyya, Glen Ellyn, IL (US); Susie C. Martins, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/547,627

(22) Filed: Nov. 19, 2014

(51) Int. Cl.
  *B01J 23/58* (2006.01)
  *B01J 31/40* (2006.01)
  *B01J 31/02* (2006.01)
  *B01J 38/48* (2006.01)

(52) U.S. Cl.
  CPC .......... *B01J 31/4069* (2013.01); *B01J 31/0298* (2013.01); *B01J 38/485* (2013.01); *B01J 2231/44* (2013.01); *B01J 2531/002* (2013.01); *B01J 2531/008* (2013.01)

(58) Field of Classification Search
  CPC ....................................................... B01J 23/58
  USPC ....................................................... 502/328
  See application file for complete search history.

(56) References Cited

U.S. PATENT DOCUMENTS

| | | | |
|---|---|---|---|
| 7,651,970 | B2 | 1/2010 | Elomari et al. |
| 7,674,739 | B2 | 3/2010 | Elomari et al. |
| 7,674,740 | B2 | 3/2010 | Harris et al. |
| 7,678,727 | B2 | 3/2010 | Harris et al. |
| 7,691,771 | B2 | 4/2010 | Harris et al. |
| 7,727,925 | B2 | 6/2010 | Elomari et al. |
| 7,732,363 | B2 | 6/2010 | Elomari et al. |
| 7,737,067 | B2 | 6/2010 | Elomari et al. |
| 7,754,636 | B2 | 7/2010 | Elomari et al. |
| 7,825,055 | B2 | 11/2010 | Elomari et al. |
| 7,956,002 | B2 | 6/2011 | Elomari et al. |
| 7,995,495 | B2 | 8/2011 | Lin |
| 8,524,623 | B2 | 9/2013 | Timken et al. |
| 8,709,236 | B2 | 4/2014 | Serban et al. |

FOREIGN PATENT DOCUMENTS

JP 04322073 B2 8/2009

OTHER PUBLICATIONS

U.S. Appl. No. 14/271,308, filed May 6, 2014.
U.S. Appl. No. 14/271,319, filed May 6, 2014.

*Primary Examiner* — Edward Johnson (57) ABSTRACT

A method for regenerating deactivated ionic liquid catalyst containing conjunct polymer. The deactivated ionic liquid catalyst containing the conjunct polymer is contacted with either at least one metal complex having a general formula $M1^{n+}R_n$, or at least one metal complex having a general formula $[M2^{a+}]_x[M3^{b+}{}_yR_z]_{(xa/(z-by))}$. The conjunct polymer reacts with the reagent and can be extracted from the ionic liquid. The mixture is separated into a hydrocarbon effluent and an ionic liquid effluent.

20 Claims, 4 Drawing Sheets

REGENERATION OF AN IONIC LIQUID CATALYST USING METAL COMPLEXES

BACKGROUND OF THE INVENTION

Commercially, the alkylation of isoparaffins is catalyzed by acids such as sulfuric acid and hydrofluoric acid. Conjunct polymer (acid soluble oils, (ASO) also known as red oil) forms as a byproduct of the alkylation reaction, as well as other hydrocarbon reactions. When too much conjunct polymer is present, the acid catalyst loses its effectiveness. The acid must be replaced with stronger acid, or the conjunct polymer must be removed in order to reactivate the catalyst. With sulfuric acid as the catalyst, the ASO is burned, and with hydrofluoric acid, the hydrofluoric acid is distilled away from the ASO. Sulfuric acid and hydrofluoric acid are hazardous and corrosive, and their use in industrial processes requires a variety of environmental controls.

There has been a move to replace the use of sulfuric acid and hydrofluoric acid with more environmentally friendly materials.

One such process utilizes acidic ionic liquids as catalysts in hydrocarbon conversion processes, such as alkylation, isomerization, disproportionation, and oligomerization. Conjunct polymers are byproducts of the hydrocarbon reaction using ionic liquids, and they form a complex with the ionic liquid catalyst. The ionic liquid catalyst loses its effectiveness over time as the amount of conjunct polymer increases. It must then either be replaced or regenerated. Because ionic liquids are typically fairly expensive, processes for regenerating the ionic liquid catalysts are needed.

A variety of methods for regenerating ionic liquids have been developed. The ionic liquid containing the conjunct polymer could be contacted with a reducing metal (e.g., Al), an inert hydrocarbon (e.g., hexane), and hydrogen and heated to about 100° C. The conjunct polymer will be transferred to the hydrocarbon phase, allowing for the conjunct polymer to be removed from the ionic liquid phase. See e.g., U.S. Pat. No. 7,651,970; U.S. Pat. No. 7,825,055; U.S. Pat. No. 7,956,002; and U.S. Pat. No. 7,732,363.

Another method involves contacting the ionic liquid containing the conjunct polymer with a reducing metal (e.g., Al) in the presence of an inert hydrocarbon (e.g. hexane), but in the absence of added hydrogen, and heating to about 100° C. The conjunct polymer will be transferred to the hydrocarbon phase, allowing for the conjunct polymer to be removed from the ionic liquid phase. See e.g., U.S. Pat. No. 7,674,739.

Still another method of regenerating the ionic liquid involves contacting the ionic liquid containing the conjunct polymer with a reducing metal (e.g., Al), HCl, and an inert hydrocarbon (e.g. hexane), and heating to about 100° C. The conjunct polymer will be transferred to the hydrocarbon phase, allowing for the conjunct polymer to be removed from the ionic liquid phase. See e.g., U.S. Pat. No. 7,727,925.

The ionic liquid can be regenerated by adding a homogeneous metal hydrogenation catalyst (e.g., $(PPh_3)_3RhCl$) to the ionic liquid containing the conjunct polymer and an inert hydrocarbon (e.g. hexane). Hydrogen would be introduced, and the conjunct polymer would be reduced and transferred to the hydrocarbon layer. See e.g., U.S. Pat. No. 7,678,727.

Another method for regenerating the ionic liquid involves adding HCl, isobutane, and an inert hydrocarbon to the ionic liquid containing the conjunct polymer and heating to about 100° C. The conjunct polymer would react to form an uncharged complex, which would transfer to the hydrocarbon phase. This reaction increases the carbon count of the conjunct polymer. See e.g., U.S. Pat. No. 7,674,740.

The ionic liquid could also be regenerated by adding a supported metal hydrogenation catalyst (e.g. Pd/C) to the ionic liquid containing the conjunct polymer and an inert hydrocarbon (e.g. hexane). Hydrogen would be introduced and the conjunct polymer would be reduced and transferred to the hydrocarbon layer. See e.g., U.S. Pat. No. 7,691,771.

Still another method involves adding a basic reagent that displaces the conjunct polymer and is a part of the regeneration of the catalyst. The basic reagents are described as nitrogen-containing compounds such as amines or pyridinium compounds. For example, a suitable substrate (e.g. pyridine) is added to the ionic liquid containing the conjunct polymer. After a period of time, an inert hydrocarbon would be added to wash away the liberated conjunct polymer. The ionic liquid precursor [1-butyl-pyridinium][Cl] would be added to the ionic liquid (e.g. [1-butyl-pyridinium][$Al_2Cl_7$]) containing the conjunct polymer followed by an inert hydrocarbon. After a given time of mixing, the hydrocarbon layer would be separated, resulting in a regenerated ionic liquid. The solid residue would be converted to ionic liquid by adding $AlCl_3$. The conjunct polymer is said to be a neutral species coordinated to free $AlCl_3$. The conjunct polymer is liberated when the chloride from the added ionic liquid precursor coordinates to the $AlCl_3$ to form $AlCl_4^-$. See e.g., U.S. Pat. No. 7,737,067.

Another method involves adding the ionic liquid containing the conjunct polymer to a suitable substrate (e.g. pyridine) and an electrochemical cell containing two aluminum electrodes and an inert hydrocarbon. A voltage would be applied and the current measured to determine the extent of reduction. After a given time, the inert hydrocarbon would be separated, resulting in a regenerated ionic liquid. See, e.g., U.S. Pat. No. 8,524,623.

All of these regeneration approaches have drawbacks. Many of them cannot achieve above 90% conversion of the conjunct polymer, which then builds up in the process. Of those that can provide high levels of conversion, hydrogenation of the spent ionic liquid with supported (e.g., U.S. Pat. No. 7,691,771) and unsupported (e.g., U.S. Pat. No. 7,678,727) hydroprocessing catalysts may result in the active catalytic metals being extracted into the ionic liquid phase. Many catalyst supports also react irreversibly with the chloroaluminate anion of the ionic liquid. Although the use of metallic aluminum for regeneration (e.g., U.S. Pat. No. 7,995,495) is effective, it introduces undesirable solids handling issues into the refinery. Finely divided aluminum is pyrophoric and presents safety issues in a refining environment. This approach also results in the creation of additional $AlCl_3$, which has to be removed from the ionic liquid phase (e.g., U.S. Pat. No. 7,754,636) to avoid building up to a molar ratio relative to the ionic liquid cation at which solids will start coming out of solution and cause plugging issues. Electrochemical approaches (e.g., U.S. Pat. No. 8,524,623) are not economically viable at commercial scales.

Therefore, there remains a need for additional methods of regenerating acidic catalysts in reactions.

SUMMARY OF THE INVENTION

One aspect of the invention involves a method for regenerating deactivated ionic liquid catalyst containing conjunct polymer. In one embodiment, the method includes contacting the deactivated ionic liquid catalyst containing the conjunct polymer in a regeneration zone under regeneration conditions with either: at least one metal complex having a general formula $M1^{n+}R_n$, where M1 is aluminum, gallium, zinc, magnesium, copper, iron, nickel, cobalt, chromium, boron, lithium, sodium, potassium, or calcium; R has a −1 charge and is independently selected from substituted and unsubstituted hydrocarbyl groups having 1-10 carbons, hydride, or halides, and n+ is the oxidation state of M1, the conjunct polymer reacting with the at least one metal complex having a general formula $M1^{n+}R_n$, resulting in a reaction mixture comprising a first ionic liquid, at least one metal compound containing M1, and the conjunct polymer; or at least one metal complex having a general formula $[M2^{a+}]_x[M3^{b+}_yR_z]_{(xa/(z-by))}$, where M2 is lithium, sodium, potassium, magnesium, or calcium, M3 is aluminum, gallium, zinc, magnesium, copper, iron, nickel, cobalt, chromium or boron, R has a −1 charge and is independently selected from substituted and unsubstituted hydrocarbyl groups having 1-10 carbons, hydride, or halides, a+ is the oxidation state of M2, b+ is the oxidation state of M3, x is the number of M2 ions, y is the number of M3 ions, and z is the number of R groups, the conjunct polymer reacting with the at least one metal complex having the general formula $[M2^{a+}]_x[M3^{b+}_yR_z]_{(xa/(z-by))}$ resulting in a mixture comprising a second ionic liquid, at least one metal compound containing the M2 ion, a metal compound containing M3, and the conjunct polymer, and separating the mixture into a hydrocarbon effluent and an ionic liquid effluent, the hydrocarbon effluent comprising the conjunct polymer, and the ionic liquid effluent comprising: the first ionic liquid and the at least one metal compound containing M1; or the second ionic liquid, the at least one metal compound containing the M2 ion, and the metal compound containing M3.

DETAILED DESCRIPTION OF THE INVENTION

It has been discovered that deactivated ionic liquid catalysts containing conjunct polymer can be regenerated using a reagent that reacts at mild conditions. The reagent is either a metal complex having a general formula $M1^{n+}R_n$, or a metal complex having a general formula $[M2^{a+}]_x[M3^{b+}_yR_z]_{(xa/(z-by))}$. The reagent reacts with the conjunct polymer, and the resulting charge neutral conjunct polymer can be washed away with a suitable solvent, such as hexane. One advantage of using these reagents is that no added hydrogen or elemental metals are needed.

In addition, the mild conditions under which the process can be performed may result in lower operating costs than processes requiring harsher conditions. The mild operating conditions may also result in lower capital costs due to the ability to use less expensive materials of construction.

In some embodiments, the ionic liquid can be regenerated without having to remove the reacted metal component in a subsequent step.

After removal of the conjunct polymer, the composition of the ionic liquid has been altered relative to its original state. If the reagent contains the same metal as the ionic liquid, separation of the two compounds is not needed. This composition can be adjusted back to its original composition by the addition of an ionic liquid component. By ionic liquid component we mean a component from which the ionic liquid was derived. For instance, in the case of [1-butyl-3-methylimidazolium][$Al_2Cl_7$], an ionic liquid component could be [1-butyl-3-methylimidazolium][Cl] since [1-butyl-3-methylimidazolium][$Al_2Cl_7$] can be synthesized from [1-butyl-3-methylimidazolium][Cl] and two equivalents of $AlCl_3$. Alternatively, an ionic liquid component for [1-butyl-3-methylimidazolium][$Al_2Cl_7$] could be [1-butyl-3-methylimidazolium][$AlCl_4$] since [1-butyl-3-methylimidazolium][$Al_2Cl_7$] can be synthesized from [1-butyl-3-methylimidazolium][$AlCl_4$] and one equivalent of $AlCl_3$.

The reagent is either at least one metal complex having a general formula $M1^{n+}R_n$, or at least one metal complex having a general formula $[M2^{a+}]_x[M3^{b+}_yR_z]_{(xa/(z-by))}$. M1 is aluminum, gallium, zinc, magnesium, copper, iron, nickel, cobalt, chromium, boron, lithium, sodium, potassium, or calcium. R has a −1 charge and is independently selected from substituted and unsubstituted hydrocarbyl groups having 1-10 carbons, hydride, or halides; n is an integer, n+ is the oxidation state of M1, and n is the number of R groups. M2 is lithium, sodium, potassium, magnesium, or calcium, and M3 is aluminum, gallium, zinc, magnesium, copper, iron, nickel, cobalt, chromium or boron; R has a −1 charge and is independently selected from substituted and unsubstituted hydrocarbyl groups having 1-10 carbons, hydride, or halides; a and b are integers, a+ is the oxidation state of M2, and b+ is the oxidation state of M3; x is the number of M2 ions, y is the number of M3 ions, and z is the number of R groups.

The R group has a −1 charge, and is independently selected from substituted and unsubstituted hydrocarbyl groups having 1-10 carbon carbons, hydrides, or halides. Hydrocarbyl groups include alkyl groups (including cyclic groups), alkenyl groups, alkynyl groups, and aromatic groups. The hydrocarbyl groups can be unsubstituted or substituted with halides, hydroxides, ethers, amines, thioethers, lactams, and combinations thereof. Halides include chlorides, bromides, iodides, fluorides, and combinations thereof.

The number of R groups depends on the formula of the metal complex and the charge of the metal(s). The R groups can be same, or they can be different.

Examples of metal complexes having the general formula $M1^{n+}R_n$ include, but are not limited to, trimethylaluminum, dimethylaluminum chloride, methylaluminum dichloride, triethylaluminum, diethylaluminum chloride, ethylaluminum dichloride, tripropylaluminum, dipropylaluminum chloride, propylaluminum dichloride, triisopropylaluminum, diisopropylaluminum chloride, isopropylaluminum dichloride, triisobutylaluminum, diisobutylaluminum chloride, isobutylaluminum dichloride, trimethylborane, triethylborane, tri-sec-butylborane, diisobutylaluminum hydride, dimethylalane ($Me_2AlH$), methylalane ($MeAlH_2$), borane, LiH, NaH, KH, $CaH_2$, $MgH_2$, or combinations thereof. Borane is $BH_3$, but can dimerize to $B_2H_6$. It can also be stabilized with a solvent. All of these are intended to be covered by the term borane. Similarly, the alane-type compounds can also dimerize or oligomerize. All of these forms are intended to be covered by this usage.

Examples of metal complexes having the general formula $[M2^{a+}]_x[M3^{b+}_yR_z]_{(xa/(z-by))}$ include, but are not limited to, $LiAlH_4$, $NaAlH_4$, $NaBH_4$, $LiBH_4$ $Ca(BH_4)_2$, $Mg(BH_4)_2$, lithium tri-tert-butoxyaluminum hydride, lithium tris[(3-ethyl-3-pentyl)oxy]aluminohydride, lithium diisobutyl-tert-butoxyaluminum hydride, sodium bis(2-methoxyethoxy)aluminum hydride, lithium triethylborohydride, or combinations thereof.

The deactivated ionic liquid catalyst containing the conjunct polymer is contacted with the metal complex having a general formula $M1^{n+}R_n$ or the metal complex having a general formula $[M2^{a+}]_x[M3^{b+}_yR_z]_{(xa/(z-by))}$ in a regeneration zone under regeneration conditions. The conjunct polymer reacts with the metal complex and allows the conjunct polymer to be extracted with a solvent. The mixture is separated into one or more hydrocarbon effluent(s) and an ionic liquid effluent. The hydrocarbon effluent comprises the conjunct polymer, the solvent if one used, and any hydrocarbons formed. The ionic liquid effluent comprises the ionic liquid and one or more various metal containing reaction products.

By deactivated ionic liquid catalysts containing conjunct polymer, we mean ionic liquid catalysts that have been used in hydrocarbon conversion processes, and in which conjunct polymers have formed. The conjunct polymer is retained in the ionic liquid, and it cannot be separated from the ionic liquid by washing with a solvent. Deactivated ionic liquid catalysts include partially or completely deactivated ionic liquid catalysts. By conjunct polymer, we mean the olefinic, conjugated cyclic hydrocarbons that form as a byproduct of various hydrocarbon conversion processes, including but not limited to alkylation, oligomerization, isomerization, disproportionation, and reverse disproportionation.

By ionic liquid, we mean an ionic liquid capable of catalyzing reactions typically carried out with an acid. As known in the art, acids such as sulfuric acid and hydrofluoric acid are often used to catalyze these reactions. These reactions include, e.g. alkylation, oligomerization, isomerization, disproportionation, and reverse disproportionation. Oftentimes, the ionic liquids employed in these reactions have Hammett acidity functions ($H_0$) less than 7, or less than 5, or less than 3, or less than 0, or less than −3, or less than −5, or less than −7, or less than −9. If the ionic liquid does not possess an acidic proton in its structure (e.g. 1-butyl-3-methylimidazolium heptachloroaluminate), addition of an exogenous acid is acceptable, provided the Hammett acidity function ($H_0$) of the added acid is less than 7 within the ionic liquid, or less than 5, or less than 3, or less than 0, or less than −3, or less than −5, or less than −7, or less than −9.

Although not wishing to be bound by theory, it is believed that the contact of the metal complex having a general formula $M1^{n+}R_n$ or the metal complex having a general formula $[M2^{a+}]_x[M3^{b+}_yR_z]_{(xa/(z-by))}$ with the ionic liquid catalyst that contains conjunct polymer converts the conjunct polymer into a compound readily extractable with a suitable solvent. The ionic liquid catalyst and the reacted metal containing compounds can be separated from the conjunct polymer, solvent if present, and any hydrocarbons formed. The ionic liquid catalyst can then be reformed and/or re-activated with acid, if needed. The reformed and/or reactivated ionic liquid catalysts can be recycled to a hydrocarbon conversion process.

When the metal complex having a general formula $M1^{n+}R_n$ is used, the reaction mixture comprises an ionic liquid, at least one metal compound containing M1, and the conjunct polymer. The ionic liquid effluent comprises the ionic liquid and the metal compound containing M1.

The metal compound containing M1 will depend on the number and type of R groups in the initial metal complex. The metal compound containing M1 will have no more than n−1 R groups.

Although not wishing to be bound by theory, it is believed that if all of the R groups are hydrocarbyl groups, a protonated hydrocarbyl group will form, and the metal compound containing M1 will have one less hydrocarbyl group. In some embodiments, an acid can be added to the ionic liquid effluent which will protonate another hydrocarbyl group. This can be repeated until no hydrocarbyl groups remain attached to the metal. For example, if trimethylaluminum is used with HCl, methane will be formed, and the metal compound containing M1 will be dimethylaluminum chloride. After the addition of HCl to the dimethylaluminum chloride, methylaluminum dichloride would be formed, then aluminum trichloride.

Although not wishing to be bound by theory, it is believed that if all the R groups are hydrides, at least two modes of operation are possible: 1) hydrogen can be formed from the reaction of the hydride with an acidic proton, either present on the conjunct polymer or free in the ionic liquid medium and 2) by donation of the hydride to the charged conjunct polymer, resulting in a conjunct polymer that has been reduced by the addition of the hydride. In both of these scenarios, the metal compound containing M1 will have one less hydride group. Thus, there is a net transfer of hydride from M1 complex. In some embodiments, an acid can be added to the ionic liquid effluent which will remove another hydride group. This can be repeated until no hydride groups remain. For example, if $CaH_2$ is used with HCl, the metal compound containing M1 will be CaHCl. If acid is added to the effluent, $CaCl_2$ will be formed. Although not wishing to be bound by theory, it is believed that the hydride removed from M1 will either be released as hydrogen gas or combined with the conjunct polymer.

When there are mixtures of hydrocarbyl groups and hydride groups, one hydrocarbyl group or hydride group will be removed, then additional hydride groups or hydrocarbyl groups depending on the initial metal complex.

When there are mixtures of hydrocarbyl groups and halide groups, the hydrocarbyl groups will be removed first.

Figure 1:
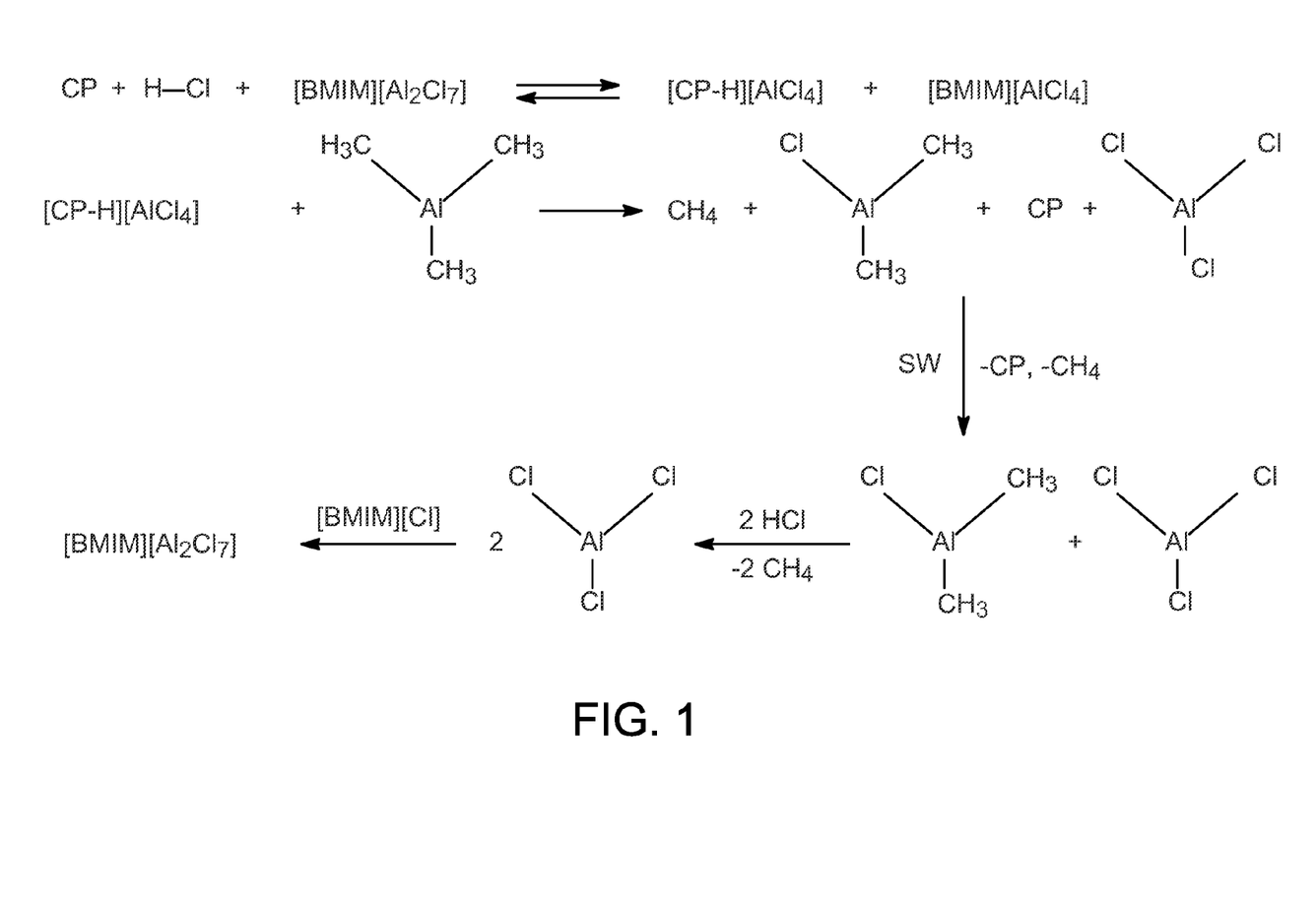
FIG. 1 is an illustration of a possible reaction sequence for $Al(CH_3)_3$.

FIG. 1 is an illustration of a possible reaction sequence for a metal complex having the general formula $M1^{n+}R_n$. The metal complex is trimethylaluminum ($Al(CH_3)_3$), and the acid is HCl. [BMIM][$Al_2Cl_7$] stands for the ionic liquid 1-butyl-3-methylimidazolium heptachloroaluminate, [BMIM][$AlCl_4$] stands for the ionic liquid component 1-butyl-3-methylimidazolium tetrachloroaluminate and [BMIM][Cl] stands for the ionic liquid component 1-butyl-3-methylimidazolium chloride. CP stands for conjunct polymer, [CP—H][$AlCl_4$] stands for the protonated conjunct polymer and SW stands for solvent wash.

In this illustration, the deactivated ionic liquid containing the bound conjunct polymer CP is treated with the ($Al(CH_3)_3$) metal complex. The bound conjunct polymer CP and the acid HCl are in equilibrium with the protonated conjunct polymer [CP—H][$AlCl_4$]. Either the protonated conjunct polymer chloride [CP—H][$AlCl_4$] or the HCl reacts with the $Al(CH_3)_3$ to form methane ($CH_4$, the protonated methyl group), $Al(CH_3)_2Cl$, and the freed conjunct polymer. A solvent wash SW can be used to help separate the freed conjunct polymer CP from the ionic liquid. The reaction mixture is separated into: a hydrocarbon effluent containing the freed conjunct polymer CP, the methane formed, and the solvent SW: and an ionic liquid effluent containing the ionic liquid and the $Al(CH_3)_2Cl$. The addition of HCl to the ionic liquid effluent removes the two methyl groups from the $Al(CH_3)_2Cl$ and replaces them with Cl ions, forming additional methane and $AlCl_3$. It is preferred to add the minimal amount of the metal complex necessary to remove the acid present, [CP—H][$AlCl_4$] or HCl in the example above. Ideally, the molar ratio of the acid:metal complex or conjunct polymer:metal complex (assuming only one acidic proton exists on the conjunct polymer) would be 3:1 for the use of $AlMe_3$.

If the $AlCl_3$ is not removed from the ionic liquid, an ionic liquid component [BMIM][Cl] can be added to re-form the ionic liquid [BMIM][$Al_2Cl_7$]. If the $AlCl_3$ is removed from the ionic liquid, the addition of the ionic liquid component

[BMIM][Cl] would not be needed. Either approach ultimately regenerates the ionic liquid and brings the composition of the regenerated ionic liquid back to the composition of fresh ionic liquid. If a metal complex is used that does not contain the same metal as the anion in the ionic liquid, then the regenerated ionic liquid will have a different composition than fresh ionic liquid, provided not all of the metal complex was removed in a separation step.

When the metal complex having the general formula $[M2^{a+}]_x[M3^{b+}{}_yR_z]_{(xa/(z-by))}$ is used, the mixture comprises an ionic liquid, at least one compound containing the M2 ion, a metal compound containing M3, and the conjunct polymer. The ionic liquid effluent comprises the ionic liquid, the metal compound containing the M2 ion, and the metal compound containing M3.

Although not wishing to be bound by theory, it is believed that if all of the R groups are hydride groups, at least two modes of operation are possible: 1) hydrogen can be formed from the reaction of the hydride with an acidic proton, either present on the conjunct polymer or free in the ionic liquid medium and 2) by donation of the hydride to the charged conjunct polymer, resulting in a conjunct polymer that has been reduced by the addition of the hydride. In both of these scenarios, the metal compound containing M3 will have one less hydride group. Thus, there is a net transfer of hydride from the M3 complex. In some embodiments, an acid can be added to the ionic liquid effluent which will remove another hydride group. This can be repeated until no hydride groups remain. Although not wishing to be bound by theory, it is believed that the hydride removed from M3 will either be released as hydrogen gas or combined with the conjunct polymer.

Figure 2:
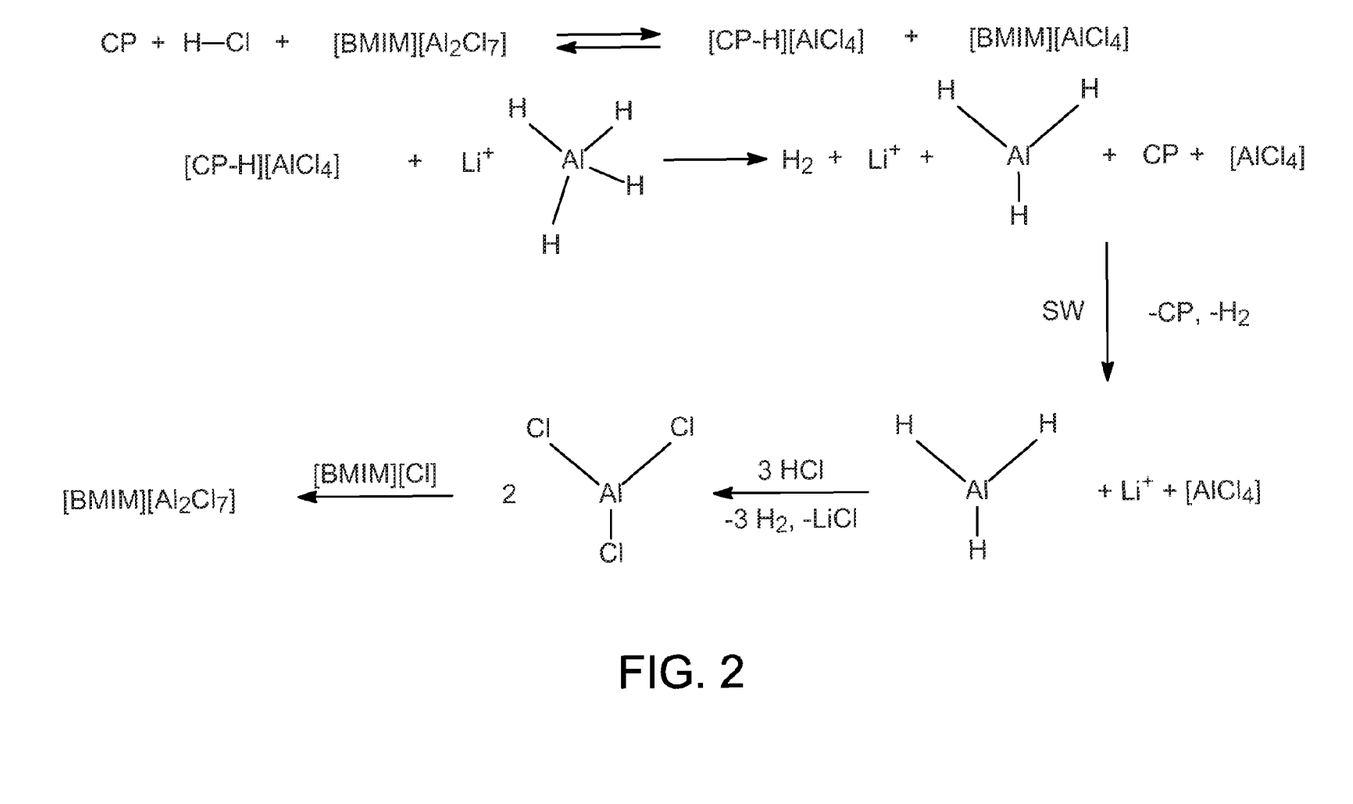
FIG. 2 is an illustration of a possible reaction sequence for $LiAlH_4$.

FIG. 2 is an illustration of a possible reaction sequence for a metal complex having the general formula $[M2^{a+}]_x[M3^{b+}{}_yR_z]_{(xa/(z-by))}$. The metal complex is lithium aluminum hydride $LiAlH_4$, the acid is HCl, and the ionic liquid $[BMIM][Al_2Cl_7]$.

In this illustration, the deactivated ionic liquid containing the bound conjunct polymer CP is treated with the $LiAlH_4$ metal complex. Either the protonated conjunct polymer chloride [CP—H][AlCl$_4$] or the HCl reacts with the $LiAlH_4$ to form hydrogen, the Li$^+$ ion, $AlH_3$, the freed conjunct polymer, and [AlCl$_4$]. In this example it is assumed that the hydride reacts with the proton to form hydrogen as discussed above, but other pathways may be operable. A solvent wash SW can be used to help separate the freed conjunct polymer CP and hydrogen from the ionic liquid. The reaction mixture is separated into a hydrocarbon effluent containing the freed conjunct polymer CP, hydrogen and the solvent SW, and an ionic liquid effluent containing the ionic liquid, $AlH_3$, and the Li$^+$ and [AlCl$_4$]. The addition of HCl removes the three hydride groups from the $AlH_3$ and replaces them with Cl ions, forming additional hydrogen, and $AlCl_3$. The Li$^+$ containing compound would then be separated, along with any additional hydrogen formed.

If the $AlCl_3$ is not removed from the ionic liquid, an ionic liquid component [BMIM][Cl] can be added to re-form the ionic liquid [BMIM][Al$_2$Cl$_7$]. If the $AlCl_3$ is removed from the ionic liquid, the addition of the ionic liquid component [BMIM][Cl] would not be needed.

In some embodiments, the deactivated ionic liquid catalyst containing the conjunct polymer is contacted with the metal complex having the general formula $M1^{n+}R_n$ or the metal complex having the general formula $[M2^{a+}]_x[M3^{b+}{}_yR_z]_{(xa/(z-by))}$ in the presence of a solvent which is immiscible with the ionic liquid (both the deactivated ionic liquid and the ionic liquid formed). In this situation, two phases will result: one containing the formed ionic liquid and the reacted metal containing compounds, and the other containing the released conjunct polymer, the solvent, and any hydrocarbons formed.

The conjunct polymer can be removed from the solvent, if desired. The conjunct polymer can be disposed of or blended into an appropriate refinery stream, such as gasoline, diesel, heavy naphtha, atmospheric gas oil, or vacuum gas oil, and the solvent can be recycled. Alternatively, if the conjunct polymer and solvent can be blended into a suitable refinery stream, no separation would be needed.

In other embodiments, the solvent immiscible with the ionic liquid is added after the contacting step in order to separate the conjunct polymer from the ionic liquid.

The deactivated ionic liquid catalyst and the metal complex having the general formula $M1^{n+}R_n$ or the metal complex having the general formula $[M2^{a+}]_x[M3^{b+}{}_yR_z]_{(xa/(z-by))}$ are contacted for a period of time sufficient to allow the conjunct polymer to react with the metal complex having the general formula $M1^{n+}R_n$ or the metal complex having the general formula $[M2^{a+}]_x[M3^{b+}{}_yR_z]_{(xa/(z-by))}$. This will typically take in the range of about 10 min to about 48 hr, or about 10 min to about 24 hr, or about 10 min to about 15 hr, or about 10 min to about 10 hr, or about 1 hr to about 10 hr, or about 3 hr to about 7 hr, or about 4 hr to about 5 hr.

The contacting typically takes place at a temperature in the range of from about −20° C. to the decomposition temperature of the ionic liquid catalysts. A typical temperature range is about −20° C. to about 200° C., or about 20° C. to about 150° C., or about 20° C. to about 125° C., or about 20° C. to about 100° C., or about 20° C. to about 75° C., or about 20° C. to about 50° C., or about 50° C. to about 175° C., or about 75° C. to about 175° C., or about 100° C. to about 175° C., or about 125° C. to about 175° C. In some embodiments, the mixture is heated. When inorganic metal hydrides are used, the temperature will typically be in the range of about 20° C. to about 50° C., or about 25° C. to about 45° C.

The pressure is typically in a range of about 10 kPa(a) to about 13.8 MPa(a), or 10 kPa(a) to about 5.5 MPa(a), or 101 kPa(a) to about 10.1 MPa(a), or about 689 kPa(a) to about 5.5 MPa(a). The pressure is typically determined by the vapor pressure of the solvent used (typically the vapor pressure of the solvent at the reaction temperature).

The amount of metal complex to be added depends on the amount of conjunct polymer present in the deactivated ionic liquid. The amount of metal complex added will need to be enough to react with all of the conjunct polymer. For example, if there is one reactive group present in the metal complex (e.g., LiH), and there are 10 equivalents of conjunct polymer present, each having one acidic proton, at least 10 equivalents of the metal complex will be needed to fully neutralize the system. If there are multiple reactive groups present (e.g., $Al(CH_3)_3$), then less metal complex would be needed. In some embodiments for the metal complex $M1^{n+}R_n$, the ratio of metal complex to be added would be at least n*[CP]:$M1^{n+}R_n$. In some embodiments for the metal complex $[M2^{a+}]_x[M3^{b+}{}_yR_z]_{(xa/(z-by))}$, the ratio of metal complex to be added would be at least (zxa/(z−by))*[CP]: $[M2^{a+}]_x[M3^{b+}{}_yR_z]_{(xa/(z-by))}$ to fully neutralize the system.

The contacting can take place in any suitable process, such as solvent extraction, or contacting in one or more mixer/settlers.

The reaction will proceed simply by contacting the metal complex having the general formula $M1^{n+}R_n$ or the metal complex having the general formula $[M2^{a+}]_x[M3^{b+}{}_yR_z]_{(xa/(z-by))}$ with the ionic liquid catalyst. However, the contact between the metal complex having the general formula M1$^{n+}$R$_n$ or the metal complex having the general formula [M2$^{a+}$]$_x$ [M3$^{b+}$$_y$R$_z$]$_{(xa/(z-by))}$ and the ionic liquid catalyst can be increased by mixing.

The contacting step may be practiced in laboratory scale experiments through full scale commercial operations. The process may be operated in batch, continuous, or semi-continuous mode. The contacting step can take place in various ways, with both countercurrent and co-current flow processes being suitable.

After contacting the ionic liquid catalyst, the metal complex having the general formula M1$^{n+}$R$_n$ or the metal complex having the general formula [M2$^{a+}$]$_x$[M3$^{b+}$$_y$R$_z$]$_{(xa/(z-by))}$, and the immiscible solvent (if present), two phases result, a catalyst phase containing the ionic liquid catalyst and one or more metal containing reaction products and an organic phase containing the conjunct polymer, any hydrocarbon products formed, and the immiscible solvent (if present). In some embodiments, the phases will separate due to the density difference between the two phases. In other embodiments, other separation processes may be needed. In some embodiments, the conjunct polymer can be decanted away. Decanting can be suitable if there is enough conjunct polymer present and it separates from the ionic liquid catalyst and other reaction products.

If the immiscible solvent is not included in the contacting step, it can be added to separate the conjunct polymer from the ionic liquid and other reaction products.

After separation of the conjunct polymer from the ionic liquid and other metal containing reaction products, the ionic liquid can be re-formed and recycled to a hydrocarbon conversion process. Re-forming the original ionic liquid involves adding an ionic liquid component (assuming the AlCl$_3$ for example has not been removed in which case this step would not be needed). The reaction with the metal complex will alter the composition of the resulting ionic liquid as a result of this addition of the metal complex. This can be rebalanced by the addition of an appropriate ionic liquid component, as described above. For example, if the ionic liquid containing the conjunct polymer is [BMIM][Al$_2$Cl$_7$], and the metal complex is AlMe$_3$, after the reaction, the ionic liquid will contain additional AlCl$_3$ and the molar ratio of [BMIM]:Al will have been altered relative to the original molar ratio. The addition of the ionic liquid component [BMIM][Cl] will reform the molar ratio of [BMIM]:Al back to its original value.

Depending on the conditions required for the hydrocarbon conversion process, an acid additive can be added, if needed. Suitable acids and acid precursors include, but are not limited to, HCl, tert-butyl chloride, or 2-chlorobutane. The acid precursor can be any molecule that will break down to form the acid.

In one embodiment, the regeneration process is a solvent extraction process. In the solvent extraction method, a solvent and the metal complex having the general formula M1$^{n+}$R$_n$ or the metal complex having the general formula [M2$^{a+}$]$_x$ [M3$^{b+}$$_y$R$_z$]$_{(xa/(z-by))}$ are added to the deactivated ionic liquid catalyst containing the conjunct polymer or vice versa. The solvent and the metal complex can be pre-mixed and added together, or they can be added separately, either at the same time or sequentially.

The deactivated ionic liquid catalyst, the solvent, and the metal complex are contacted long enough for the conjunct polymer to react with the metal complex having the general formula M1$^{n+}$R$_n$ or the metal complex having the general formula [M2$^{a+}$]$_x$[M3$^{b+}$$_y$R$_z$]$_{(xa/(z-by))}$. The deactivated ionic liquid catalyst, the solvent, and the metal complex are typically mixed while being contacted.

The mixture is then allowed to separate into two phases: an ionic liquid phase with metal containing reaction products and a hydrocarbon phase with the conjunct polymer, any hydrocarbon reaction products, and the solvent. In some embodiments, separation occurs due to the density difference between the ionic liquid phase and the hydrocarbon phase.

The hydrocarbon layer is decanted from the ionic liquid. The ionic liquid can be further washed with solvent (either the same solvent used in the extraction or a different one), if desired. As the reaction occurs, the conjunct polymer is extracted into the solvent layer.

The ionic liquid can be any ionic liquid. There can be one or more ionic liquids. The ionic liquid comprises an organic cation and an anion. Suitable cations include, but are not limited to, nitrogen-containing cations and phosphorus-containing cations. Suitable organic cations include, but are not limited to:

where R$^1$-R$^{21}$ are independently selected from C$_1$-C$_{20}$ hydrocarbons, C$_1$-C$_{20}$ hydrocarbon derivatives, halogens, and H, and lactamium ionic liquids. Suitable hydrocarbons and hydrocarbon derivatives include saturated and unsaturated hydrocarbons, halogen substituted and partially substituted hydrocarbons and mixtures thereof. C$_1$-C$_8$ hydrocarbons are particularly suitable.

Lactamium ionic liquids include, but are not limited to, those described in U.S. Pat. No. 8,709,236, U.S. application Ser. No. 14/271,308, entitled Synthesis of Lactam Based Ionic Liquids, filed May 6, 2014, and U.S. application Ser. No. 14/271,319, entitled Synthesis of N-Derivatized Lactam Based Ionic Liquids, filed May 6, 2014, which are incorporated by reference.

The anion can be derived from halides, sulfates, bisulfates, nitrates, sulfonates, fluoroalkanesulfonates, halometallates and combinations thereof. The anion is typically derived from metal and nonmetal halides, such as metal and nonmetal chlorides, bromides, iodides, fluorides, or combinations thereof. Combinations of anions include, but are not limited to, mixtures of two or more metal halides (e.g., AlC$_4$$^-$ and BF$_4$$^-$), and mixtures of two or more halides with a single metal (e.g., AlCl$_3$Br$^-$). In some embodiments, the metal is aluminum, with the mole fraction of aluminum ranging from 0<Al<0.25 in the anion. Suitable anions include, but are not limited to, AlCl$_4$$^-$, Al$_2$Cl$_7$$^-$, Al$_3$Cl$_{10}$$^-$, AlCl$_3$Br$^-$, Al$_2$Cl$_6$Br$^-$, Al$_3$Cl$_9$Br$^-$, AlBr$_4$$^-$, Al$_2$Br$_7$$^-$, Al$_3$Br$_{10}$$^-$, GaCl$_4$$^-$, Ga$_2$Cl$_7$$^-$, Ga$_3$Cl$_{10}$$^-$, GaCl$_3$Br$^-$, Ga$_2$Cl$_6$Br$^-$, Ga$_3$Cl$_9$Br$^-$, CuCl$_2$$^-$, Cu$_2$Cl$_3$$^-$, Cu$_3$Cl$_4$$^-$, ZnCl$_3$$^-$, FeCl$_3$$^-$, FeCl$_4$$^-$, Fe$_3$Cl$_7$$^-$, PF$_6$$^-$, and BF$_4$$^-$.

In some embodiments, the anion is a halometallate. The halometallate anion can be metal chlorides, bromides, iodides, fluorides, or combinations thereof. Suitable metals in the halometallate include, but are not limited to, aluminum, iron, copper, zinc, and gallium. Examples of suitable halometallates include, but are not limited to, $Al_2X_7^-$, $AlX_4^-$, $Al_3X_{10}^-$, where X is independently selected from the group consisting of F, Cl, Br, and I.

The immiscible solvent will depend on the ionic liquid catalysts being regenerated. The solvent can be any solvent which is capable of forming a separate phase from the ionic liquid catalyst phase (both the deactivated ionic liquid and the formed ionic liquid). There can be one or more solvents. Suitable solvents include, but are not limited to, n-paraffins, isoparaffins, and cyclic paraffins, such as $C_4$ to $C_{10}$ n-paraffins, isoparaffins, and cyclic paraffins, and aromatic solvents. Examples of suitable solvents include, but are not limited to, propane, n-butane, isobutane, n-pentane, isopentane, n-hexane, isohexane, methylcyclohexane, cyclohexane, methylcyclopentane, n-paraffins, isoparaffins, naphthenes, and aromatics or combinations thereof.

Figure 3:
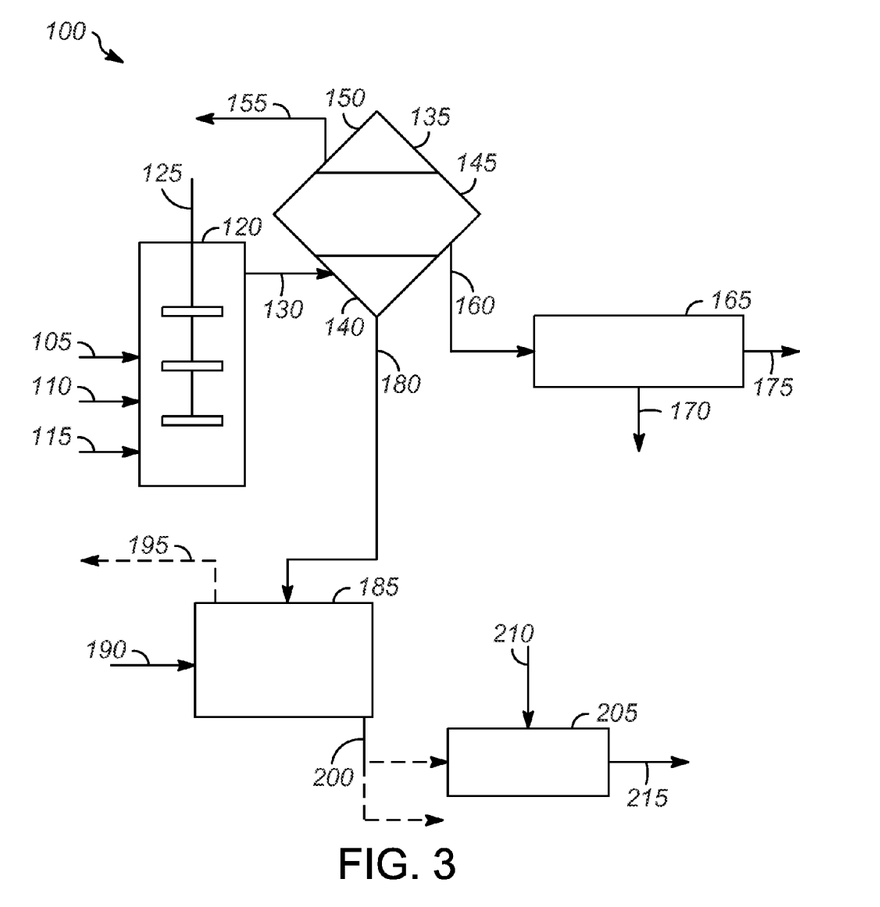
FIG. 3 illustrates one embodiment of a method for regenerating deactivated acidic catalysts containing conjunct polymer according to the present invention.

FIG. 3 illustrates one embodiment of the process 100. For ease of description, the process will be described using trimethylaluminum in the presence of 1-butyl-3-methylimidazolium heptachloroaluminate ([BMIM][$Al_2Cl_7$]) ionic liquid, using HCl as the acid.

The trimethylaluminum 105, the solvent 110, and the ionic liquid containing the conjunct polymer 115 are introduced into regeneration zone 120 where they are contacted. The mixture can be stirred using a mixer 125, if desired. The deactivated ionic liquid catalyst containing the conjunct polymer 115 reacts with the trimethylaluminum 105, and the conjunct polymer is easily transferred to the organic phase.

The mixture 130 is sent to a settler 135, where phase separation occurs. The heavier ionic liquid catalyst phase 140 containing the ionic liquid and dimethylaluminum chloride settles to the bottom below the lighter hydrocarbon phase 145 containing the conjunct polymer, and the solvent. There may be a gas and/or vapor phase 150 which can be removed in stream 155 and further processed, if desired. In this example, methane forms. The gas and/or vapor phase 150 can contain one or more of solvent, methane, nitrogen, and HCl (or other acids if a source of the other acid was used).

A stream 160 of the hydrocarbon phase 145 is sent to a separation zone 165 where the solvent 170 is separated from the conjunct polymer 175. The solvent 170 can be recycled to the regeneration zone 120. The conjunct polymer 175 can be recovered for blending into a suitable refinery stream or other use.

A stream 180 of the ionic liquid catalyst phase 140 containing the ionic liquid and the dimethylaluminum chloride can be sent to a reaction zone 185. An acid, HCl, 190 can be added to the stream 180 of the ionic liquid catalyst phase 140 in the reaction zone 185. The dimethylaluminum chloride reacts with the acid 190 forming aluminum chloride 195, which can be recovered in some embodiments, ionic liquid 200, and methane. If the aluminum chloride 195 is removed, then ionic liquid 200 can be recycled to a hydrocarbon conversion process (not shown), such as alkylation, isomerization, disproportionation, reverse disproportionation, and oligomerization.

If the aluminum chloride was not been removed in the prior step, the ionic liquid 200 is sent to an ionic liquid recovery zone 205 where an ionic liquid component 210 is added to re-form the original ionic liquid. The reformed ionic liquid 215 can then be recycled to the hydrocarbon conversion process (not shown).

Figure 4:
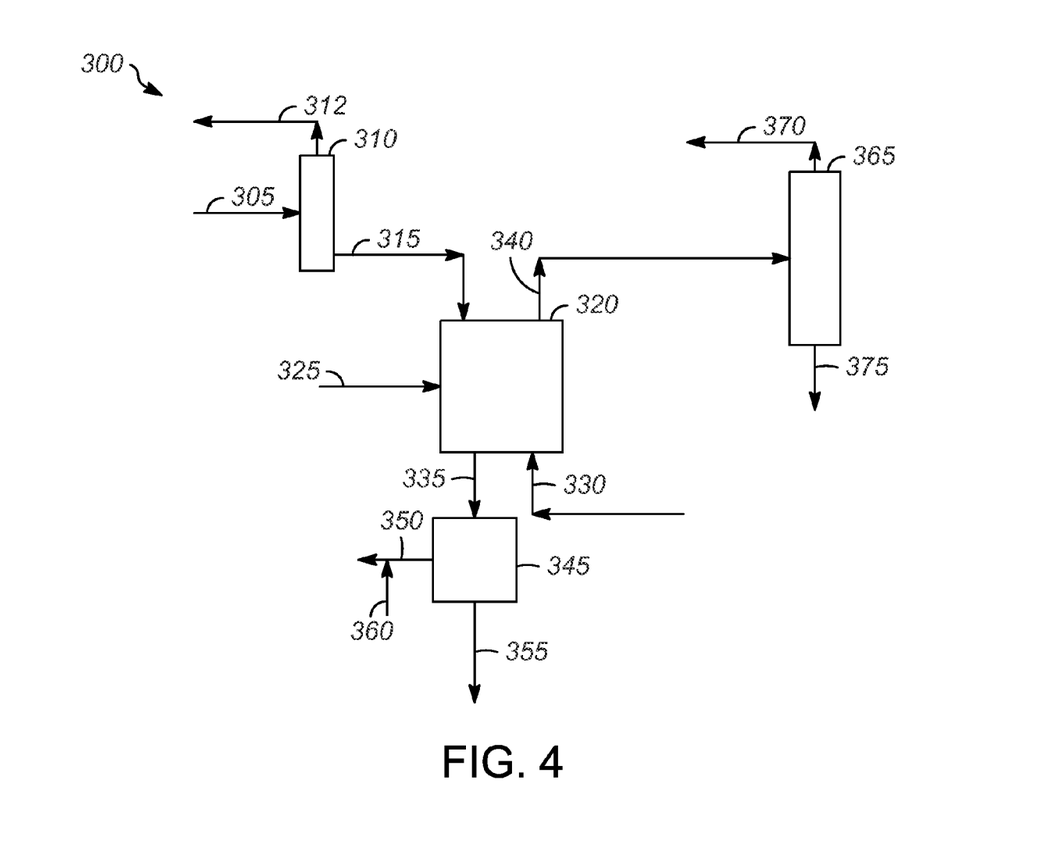
FIG. 4 illustrates another embodiment a method for regenerating deactivated acidic catalysts containing conjunct polymer according to the present invention.

FIG. 4 illustrates another embodiment of the process 300. This process will be described using the inorganic metal hydride lithium aluminum hydride.

Deactivated ionic liquid catalyst containing conjunct polymer 305 is introduced into an optional acid stripper 310 where any free acid 312 is stripped from the deactivated ionic liquid catalyst containing conjunct polymer 305.

The stripped deactivated ionic liquid catalyst containing conjunct polymer 315 is sent to a reactive extraction zone 320. Lithium aluminum hydride, 325 is contacted with the stripped deactivated ionic liquid catalyst containing conjunct polymer 315 and an extraction solvent 330 in the reactive extraction zone 320.

The lithium aluminum hydride reacts with the conjunct polymer releasing the conjunct polymer and forming compounds containing Li and Al. The reaction mixture is separated into a stream 335 comprising the ionic liquid and the compounds containing Li and Al and a stream 340 comprising the conjunct polymer and solvent.

The stream 335 comprising the ionic liquid and the compounds containing Li and Al is sent to a separation zone 345 where the ionic liquid 350 is separated from the Li containing compound 355. The Li containing compound 355 can be recovered and further processed, if desired.

The ionic liquid 350 may still contain some residual Al containing compounds with unreacted R groups. Addition of an acid (HCl) can remove these remaining R groups forming hydrogen and aluminum chloride. If the composition of the resulting ionic liquid is significantly different than the original ionic liquid, an ionic liquid component can be added to bring the composition back to the original composition. The resulting ionic liquid can be reactivated by adding an acid (HCl) or acid precursor 360. The reactivated ionic liquid can be recycled to a hydrocarbon conversion process (not shown), or optionally an ionic liquid component can be added prior to recycling to a hydrocarbon conversion process.

The stream 340 comprising the conjunct polymer and solvent is sent to a separation zone 365 where the solvent 370 is separated from the conjunct polymer 375. The solvent 370 can be recycled to the reactive extraction zone 320. The conjunct polymer 375 can be recovered for blending into a suitable refinery stream or other use.

EXAMPLES 0.17 g $NaAlH_4$ was mixed with 10 g of spent tributylhexylphosphonium heptachloroaluminate ([TBHP][$Al_2Cl_7$]) ionic liquid containing 0.616 g conjunct polymer in the presence of 10 g of toluene for 40 min. at 23° C. Hexane was added to extract any organics. Hydrolysis of the regenerated ionic liquid showed that 90% of the conjunct polymer was removed.

0.27 g LiH was mixed with 10 g of spent [TBHP][$Al_2Cl_7$] ionic liquid containing 0.616 g conjunct polymer in the presence of 10 g of n-hexane and heated to 45° C. for 1.5 hr while stirring. Hydrolysis of the regenerated ionic liquid showed that 93% of the conjunct polymer was removed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed:

1. A method for regenerating deactivated ionic liquid catalyst containing conjunct polymer comprising:
   contacting the deactivated ionic liquid catalyst containing the conjunct polymer in a regeneration zone under regeneration conditions with either:
   at least one metal complex having a general formula $M1^{n+}R_n$, where M1 is aluminum, gallium, zinc, magnesium, copper, iron, nickel, cobalt, chromium, boron, lithium, sodium, potassium, or calcium; R has a −1 charge and is independently selected from substituted and unsubstituted hydrocarbyl groups having 1-10 carbons, hydride, or halides, and $n^+$ is the oxidation state of M1, the conjunct polymer reacting with the at least one metal complex having a general formula $M1^{n+}R_n$, resulting in a reaction mixture comprising a first ionic liquid, at least one metal compound containing M1, and the conjunct polymer; or
   at least one metal complex having a general formula $[M2^{a+}]_x[M3^{b+}{}_yR_z]_{(xa/(z-by))}$, where M2 is lithium, sodium, potassium, magnesium, or calcium, M3 is aluminum, gallium, zinc, copper, iron, nickel, cobalt, chromium or boron, R has a −1 charge and is independently selected from substituted and unsubstituted hydrocarbyl groups having 1-10 carbons, hydride, or halides, $a^+$ is the oxidation state of M2, $b^+$ is the oxidation state of M3, x is the number of M2 ions, y is the number of M3, and z is the number of R groups, the conjunct polymer reacting with the at least one metal complex having the general formula $[M2^{a+}]_x[M3^{b+}{}_yR_z]_{(xa/(z-by))}$ resulting in a mixture comprising a second ionic liquid, at least one metal compound containing the M2 ion, a metal compound containing M3, and the conjunct polymer;
   and
   separating the mixture into a hydrocarbon effluent and an ionic liquid effluent, the hydrocarbon effluent comprising the conjunct polymer, and the ionic liquid effluent comprising: the first ionic liquid and the at least one metal compound containing M1; or the second ionic liquid, the at least one metal compound containing the M2 ion, and the metal compound containing M3.

2. The method of claim 1 wherein the deactivated ionic liquid catalyst containing the conjunct polymer is contacted with the at least one metal complex having the general formula $M1^{n+}R_n$, wherein at least one R is the hydrocarbyl group, and wherein the conjunct polymer reacts with the at least one metal complex having the general formula $M1^{n+}R_n$, resulting in the mixture comprising the first ionic liquid, a protonated hydrocarbyl group, the at least one metal compound containing M1, and the conjunct polymer; and wherein the hydrocarbon effluent further comprises the protonated hydrocarbyl group, and further comprising:
   adding an acid to the ionic liquid effluent resulting in a third ionic liquid.

3. The method of claim 2 further comprising adding an ionic liquid component to the third ionic liquid resulting in an fourth ionic liquid.

4. The method of claim 3 further comprising recycling the fourth ionic liquid catalyst to a hydrocarbon conversion process.

5. The method of claim 2 wherein at least one R is the halide.

6. The method of claim 1 wherein the deactivated ionic liquid catalyst containing the conjunct polymer is contacted with the at least one metal complex having the general formula $M1^{n+}R_n$, wherein at least one R is the hydride, and wherein the conjunct polymer reacts with the at least one metal complex having the general formula $M1^{n+}R_n$, resulting in the mixture comprising the first ionic liquid, the at least one metal compound containing M1, and the conjunct polymer; and further comprising:
   adding an acid to the ionic liquid effluent resulting in a fifth ionic liquid.

7. The method of claim 6 further comprising adding an ionic liquid component to the fifth ionic liquid to form a sixth ionic liquid.

8. The method of claim 7 further comprising recycling the sixth ionic liquid catalyst to a hydrocarbon conversion process.

9. The method of claim 1 wherein the deactivated ionic liquid catalyst containing the conjunct polymer is contacted with the at least one metal complex having the general formula $[M2^{a+}]_x[M3^{b+}{}_yR_z]_{(xa/(z-by))}$, wherein at least one R is the hydrocarbyl group, the conjunct polymer reacting with the at least one metal complex having the general formula $[M2^{a+}]_x[M3^{b+}{}_yR_z]_{(xa/(z-by))}$, resulting in the mixture comprising the second ionic liquid, a second protonated hydrocarbyl group, the at least one metal compound containing the M2 ion, the metal compound containing M3, and the conjunct polymer; and wherein the ionic liquid effluent comprises the second ionic liquid, the at least one metal compound containing the M2 ion, and the metal compound containing M3, and further comprising:
   removing the at least one metal compound containing the M2 ion from the second ionic liquid.

10. The process of claim 9 further comprising:
    recycling the second ionic liquid to a hydrocarbon conversion process; and
    optionally adding an acid to the second ionic liquid before recycling the second ionic liquid.

11. The method of claim 1 wherein the deactivated ionic liquid catalyst containing the conjunct polymer is contacted with the at least one metal complex having the general formula $[M2^{a+}]_x[M3^{b+}{}_yR_z]_{(xa/(z-by))}$, wherein at least one R is the hydride, the conjunct polymer reacting with the at least one metal complex having the general formula $[M2^{a+}]_x[M3^{b+}{}_yR_z]_{(xa/(z-by))}$ resulting in the mixture comprising the second ionic liquid, the at least one metal compound containing the M2 ion, the at least one metal compound containing M3, hydrogen, and the conjunct polymer; and wherein the ionic liquid effluent comprises the second ionic liquid, the at least one metal compound containing the M2 ion, and the metal compound containing M3, and further comprising:
    removing the at least one metal compound containing the M2 ion from the second ionic liquid;
    adding an acid to the second ionic liquid resulting in a seventh ionic liquid catalyst.

12. The method of claim 11 further comprising adding an ionic liquid component to the seventh ionic liquid resulting in an eighth ionic liquid.

13. The method of claim 12 further comprising recycling the eighth ionic liquid catalyst to a hydrocarbon conversion process.

14. The method of claim 1 wherein contacting the deactivated ionic liquid catalyst containing the conjunct polymer with the at least one metal complex having a general formula $M1^{n+}R_n$ or the at least one metal complex having a general formula $[M2^{a+}]_x[M3^{b+}{}_yR_z]_{(xa/(z-by))}$ takes place in the presence of a solvent immiscible in the deactivated ionic liquid catalyst, and the first or second ionic liquid.

15. The method of claim 14 further comprising;
separating the hydrocarbon effluent into a solvent stream and a conjunct polymer stream; and
optionally recycling the solvent stream to the regeneration zone.

16. The method of claim 14 wherein the solvent comprises a paraffin having up to 10 carbon atoms, naphthenes, an aromatic, or combinations thereof.

17. The method of claim 1 wherein the at least one metal complex having the general formula $M1^{n+}R_n$, comprises trimethylaluminum, dimethylaluminum chloride, methylaluminum dichloride, triethylaluminum, diethylaluminum chloride, ethylaluminum dichloride, tripropylaluminum, dipropylaluminum chloride, propylaluminum dichloride, triisopropylaluminum, diisopropylaluminum chloride, isopropylaluminum dichloride, triisobutylaluminum, diisobutylaluminum chloride, isobutylaluminum dichloride, trimethylborane, triethylborane, tri-sec-butylborane diisobutylaluminum hydride, dimethylalane ($Me_2AlH$), methylalane ($MeAlH_2$), borane, LiH, NaH, KH, $CaH_2$, $MgH_2$, or combinations thereof, or wherein the at least one metal complex having the general formula $[M2^{a+}]_x[M3^{b+}{}_yR_z]_{(xa/(z-by))}$ comprises $LiAlH_4$, $NaAlH_4$, $NaBH_4$, $LiBH_4$ $Ca(BH_4)_2$, $Mg(BH_4)_2$, lithium tri-tert-butoxyaluminum hydride, lithium tris[(3-ethyl-3-pentyl)oxy]aluminohydride, lithium diisobutyl-tert-butoxyaluminum hydride, sodium bis(2-methoxyethoxy)aluminum hydride, lithium triethylborohydride, or combinations thereof.

18. The method of claim 1 wherein the regeneration conditions include at least one of a temperature in a range of from about −20° C. to about 200° C., a contact time of between about 10 minutes and about 48 hours, and a pressure in a range of about 10 kPa (1 atm) to about 10.1 MPa (100 atm).

19. The process of claim 1 wherein the ionic liquid comprises at least one of an imidazolium ionic liquid, a pyridinium ionic liquid, a phosphonium ionic liquid, a lactamium ionic liquid, an ammonium ionic liquid, a pyrrolidinium ionic liquid.

20. The process of claim 1 wherein an anion of the ionic liquid comprises a halide, a sulfate, a bisulfate, a nitrate, a sulfonate, a fluoroalkanesulfonate, halometallates, or combinations thereof.

\* \* \* \* \*